B. H. SMITH.
ELECTRICAL PROTECTIVE DEVICE.
APPLICATION FILED JULY 12, 1915.

1,286,815. Patented Dec. 3, 1918.

WITNESSES:
Fred. A. Lind
JH Procter

INVENTOR
Benjamin H. Smith
BY
Wesley G. Carr
ATTORNEY

UNITED STATES PATENT OFFICE.

BENJAMIN H. SMITH, OF TURTLE CREEK, PENNSYLVANIA, ASSIGNOR TO WESTINGHOUSE ELECTRIC AND MANUFACTURING COMPANY, A CORPORATION OF PENNSYLVANIA.

ELECTRICAL PROTECTIVE DEVICE.

1,286,815.

Specification of Letters Patent.   Patented Dec. 3, 1918.

Application filed July 12, 1915.   Serial No. 39,386.

*To all whom it may concern:*

Be it known that I, BENJAMIN H. SMITH, a citizen of the United States, and a resident of Turtle Creek, in the county of Allegheny and State of Pennsylvania, have invented a new and useful Improvement in Electrical Protective Devices, of which the following is a specification.

My invention relates to electrical protective devices and particularly to relays.

The object of my invention is to provide a definite time-limit relay having a relatively large time element in its operation.

Co-pending U. S. application Serial No. 771,888, filed June 5, 1913 by Almon W. Copley and Benjamin H. Smith, and assigned to the Westinghouse Electric and Manufacturing Company, discloses a relay that is provided with a saturated transformer for the purpose of producing a definite time element in the operation of the relay. When such relays are used on ring-connected transmission systems, it is advisable to have the relays so adjusted that their time elements will be materially different from each other. Heretofore it has been found difficult to obtain a sufficiently large range in the time element of this type of relay to permit any considerable number of such relays to be used on a single system.

I provide means for materially increasing the range of the time element of definite time-limit relays.

My invention is primarily intended as a relay, but may be adapted to other applications. It is to be understood, therefore, that the references to relays in the following description do not limit the application of the invention or restrict the scope of the claims.

Figure 1:
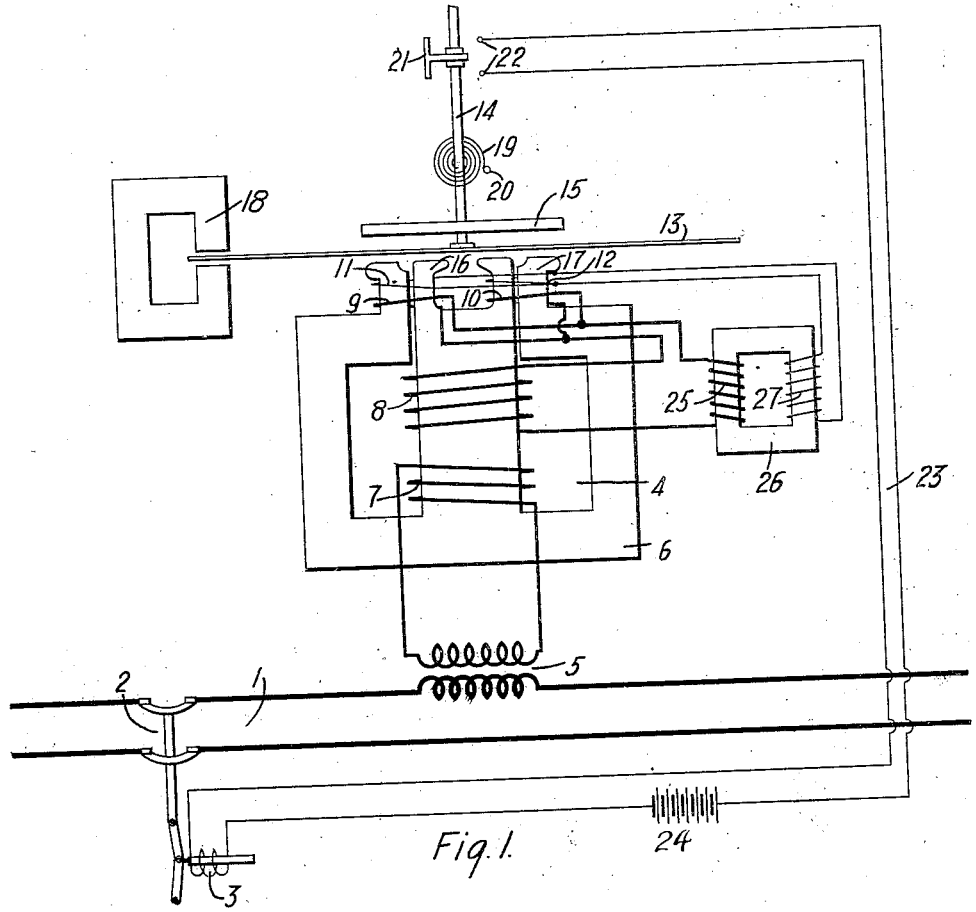
Figure 2:
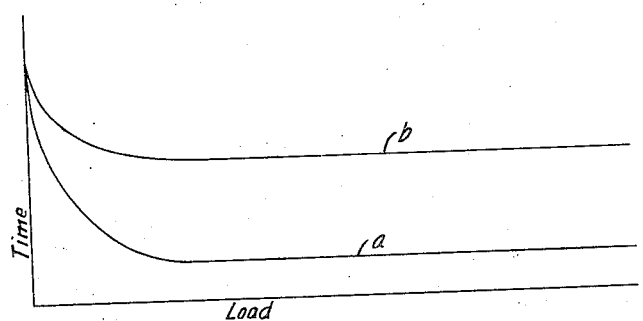

In the accompanying drawings, Figure 1 is a diagrammatic view of an electrical circuit to which is connected a relay embodying my invention, and Fig. 2 is a diagram illustrating the load-time curve obtained with a relay embodying my invention.

An electrical circuit 1 is provided with a circuit interrupter 2, a tripping device 3 therefor, and a time-element relay 4 that is supplied with current from a transformer 5 which is connected in the circuit 1. The relay 4 is provided for controlling the circuit of the tripping device 3 and operates in a manner hereinafter more fully set forth.

The relay 4 comprises a magnetizable core member 6 having a main winding 7, a secondary winding 8 and four auxiliary windings 9, 10, 11 and 12 disposed thereon. An armature 13 is mounted on a shaft 14 and is adapted to turn between a stationary magnetizable keeper or member 15 and the pole pieces 16 and 17 of the magnetizable core member 6. The armature 13 is adapted to also turn between the poles of a permanent magnet 18 for the purpose of retarding its motion. A spring 19 is connected, at one end, to the shaft 14 and, at its other end, to a stationary member 20. A movable contact member 21 is mounted on the shaft 14, and is adapted to engage stationary contact members 22 that constitute the terminals of a circuit 23 which consists of a source of electromotive force 24 and the winding of the tripping device 3.

The secondary winding 7 of the relay 4 is connected, in series relation, to a winding 25 that is disposed on a relatively small transformer 26, the magnetizable core member of which is easily saturable. The auxiliary windings 9 and 10 are connected in parallel relation to each other, and the circuit, thus constituted, is connected in series relation to the windings 8 and 25. The auxiliary windings 11 and 12 are connected in parallel relation with respect to each other and in series with a winding 27 that is also disposed on the core of the transformer 26.

The windings 9 and 10 are so wound on the pole pieces 16 and 17, respectively, of the magnetizable core member 6 that they oppose the windings 11 and 12 which are also wound on the pole pieces 16 and 17, respectively. The core member of the transformer 26 is of such size that it is adapted to become magnetically saturated when predetermined currents traverse the winding 25.

The relay herein set forth is substantially the same as the relay described in the patent application Serial Number 771,888, with the exception that, in this application, the auxiliary windings 9 and 10 have been added for the purpose of opposing the effect of the windings 11 and 12. The curve *a*, shown in Fig. 2 of the drawings, illustrates the time-load characteristics of the relay described in the patent application, Serial Number 771,888, and the curve *b* illustrates the time-load characteristics of a relay embodying my present invention. From the curves, it will be seen that a much greater range of time may be obtained with my present invention.

When a predetermined load traverses the circuit 1, a proportional current traverses the secondary winding of the transformer 5, and consequently, the main winding 7 of the relay 4. Current will then traverse the windings 8, 25, 9 and 10, and a voltage will be induced in the winding 27 of the transformer 26. Since the winding 27 is connected in circuit with the windings 11 and 12, a current will traverse the same. It will thus be seen that the winding 7 induces magnetic lines of force in the magnetizable core member 6 that are proportional to the value of the current traversing the circuit 1. Since the core member of the transformer 26 is easily saturable, the windings 11 and 12 will induce a substantially constant number of magnetic lines of force in the core member 6, and the windings 9 and 10 will induce magnetic lines of force in the core member 6 that are substantially proportional to the current that traverses the circuit 1 and opposes the magnetic lines of force induced by the windings 11 and 12. Since the magnetic lines of force induced by the several windings are out of phase with each other, the armature will be cut by a substantially shifting magnetic flux that will cause the same to turn against the action of the spring 19. The armature 13 will develop a torque that is substantially constant, because it is developed by two forces, one of which is proportional to the value of the current traversing the circuit 1 and the other of which is a resultant of a constant force and an opposing force that is proportional to the value of the current traversing the circuit 1. It has been found by experiment that a very much larger time element may be secured when the windings 9 and 10 are provided, and also that a very much better load-time characteristic curve is obtained. The damping magnet 18 is provided, together with the spring 19, for the purpose of securing various time-element characteristics within the limits afforded by the instrument.

I have described the principle and operation of my invention, together with an arrangement of parts which is now considered preferable, but I do not limit my invention except as set forth in the appended claims.

I claim as my invention:

1. A motor comprising a magnetizable core member having two oppositely-acting auxiliary windings and a main winding thereon, a relatively small magnetically saturable core member, a winding thereon a portion of the circuit of which is inductively related to the magnetizable core member and electrically connected to one of the auxiliary windings, and a second winding thereon that is connected to the other auxiliary winding.

2. A motor comprising a magnetizable core member having two oppositely-acting auxiliary windings and a main winding thereon, an armature, and means connected in circuit with the said auxiliary windings to coöperate with the main winding to cause the armature to develop a substantially constant torque, for all values of current that traverses the main winding above a predetermined value.

3. A relay comprising a magnetizable core member having two oppositely-acting auxiliary windings and a main winding thereon, one of the said auxiliary windings being supplied with current in accordance with current that traverses the main windings, and means for supplying the other auxiliary winding with a substantially constant current.

4. A relay comprising a magnetizable core member, a main winding thereon, two auxiliary oppositely-acting windings thereon, inductively connected to the main winding, one of the said auxiliary windings being supplied with current substantially proportional to the current that traverses the main winding, and means for supplying the other auxiliary winding with a substantially constant current.

5. A relay comprising a magnetizable core member, a main winding thereon, two auxiliary oppositely-acting windings thereon, an armature, and a reactor interposed in the circuit of one of the auxiliary windings, the other auxiliary winding being supplied with current substantially in proportion to the current that traverses the main winding, said auxiliary windings coöperating with the main winding to cause the armature to develop a substantially constant torque.

6. A relay comprising a magnetizable core member having two oppositely-acting auxiliary windings, a main winding and a secondary winding thereon, an armature, and a transformer having two windings thereon, one of the transformer windings being connected in circuit with one of the auxiliary windings and the other being connected in circuit with the secondary winding and with the other auxiliary winding, said transformer being adapted to be magnetically saturated under predetermined conditions.

7. A relay comprising an armature, two oppositely-acting auxiliary windings, a main winding and a transformer interposed between the main winding and one of the auxiliary windings and adapted to be magnetically saturated under predetermined conditions, the other auxiliary winding being supplied with current in accordance with the current that traverses the main winding.

8. A relay comprising an armature, a magnetizable core member having two oppositely-acting auxiliary windings and a main winding thereon, and a normally magnetically saturated transformer having a winding inductively connected to the magnetizable core member and electrically connected to one of the auxiliary windings and a second winding that is connected to the other auxiliary winding.

In testimony whereof I have hereunto subscribed my name this 29th day of June, 1915.

BENJAMIN H. SMITH.